Patented July 1, 1941

2,247,404

UNITED STATES PATENT OFFICE 2,247,404

ARALKYL POLYHYDRIC PHENOL

Ralph P. Perkins and Fred Bryner, Midland, Mich., assignors to The Dow Chemical Company, Midland, Mich., a corporation of Michigan No Drawing. Application March 24, 1939, Serial No. 263,912

14 Claims. (Cl. 260—619)

This invention relates to a class of new aralkyl polyhydric phenols and to a method of making the same.

The new compounds of the invention correspond to the general formula

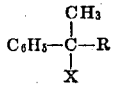

wherein X is a polyhydroxy aryl or halo-aryl radical of the benzene series, and R is hydrogen or a lower alkyl radical. They are useful as germicides and fungicides, as intermediates in the manufacture of synthetic resins and insecticides, as polymerization inhibitors, and in some cases as photographic developing agents.

Our new products may be prepared by reacting a 2-phenyl-1-alkene, e. g. styrene, alpha-methyl styrene, alpha-ethyl styrene, etc., with a suitable phenol, i. e. with a polyhydroxy benzene or halo-benzene containing not more than five substituent groups per molecule, in the presence of a condensation catalyst. Among the polyhydroxy benzenes and halo-benzenes which may be used in the process are catechol, resorcinol, hydroquinone, 1,2-dihydroxy-4-chloro-benzene, 1,4-dihydroxy-2,6-dibromobenzene, pyrogallol, phloroglucinol, hydroxy-quinol, etc.

According to one procedure, the polyhydric phenol and a small proportion, i. e. 0.1 to 10.0 per cent by weight, of a condensation catalyst, are heated to a reaction temperature, e. g. 50° to 200° C., depending upon the particular reactants employed, and the styrene compound is added slowly with agitation. When such addition is complete, the mixture is maintained at the operating temperature for a time to allow completion of the reaction; the catalyst is removed or destroyed by suitable known means, and the mixture is fractionally distilled at reduced pressure to separate the desired aralkyl polyhydric phenol. If the phenol to be condensed is a solid at operating temperatures, the reaction may be carried out in an inert solvent. The reactants may be mixed in any desired proportions, but in most instances we prefer to use 1.5 to 2.5 mols of polyhydric phenol per mol of styrene compound.

In practice we may employ any of the usual condensation catalysts, e. g. aluminum chloride, ferric chloride, sulfuric acid, phosphoric acid, acid-activated bleaching earths, and the like. For most reactions, however, it is preferable to use hydrogen chloride or hydrogen bromide, either per se or in aqueous solution, as catalyst. Under these conditions, the product of reaction consists chiefly of a para-substituted aralkyl phenol, unless the phenolic reactant has no position para to a hydroxyl group open for substitution, in which case the aralkyl group enters the ortho position.

The following examples illustrate the invention, but are not to be construed as limiting its scope:

Example 1

A mixture of 2 mols (220 grams) of catechol and 1 c. c. of concentrated hydrochloric acid was heated to a temperature of 120° C., and 1 mol (118 grams) of alpha-methyl styrene was added with agitation during 0.6 hour. The resulting mixture was then heated at 120°–150° C. for 0.5 hour to insure completion of the reaction. The crude product was then cooled, neutralized with aqueous sodium hydroxide, and fractionally distilled at an absolute pressure of 7 millimeters of mercury. In this way there were recovered some unreacted alpha-methyl styrene and catechol, and 185.7 grams of 4-(alpha phenyl isopropyl) catechol

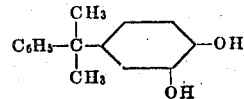

a white crystalline solid having a freezing point of 94.5° C. After repeated recrystallization from cyclohexane, the product had a freezing point of 97° C., and a boiling point of 216° C. at 10 millimeters pressure. At higher pressures the compound decomposes on boiling. The yield was 84 per cent, based on the catechol consumed.

Example 2

Resorcinol was reacted with alpha-methyl styrene and the crude product was then purified, according to the procedure in Example 1. There was obtained 4-(alpha phenyl isopropyl) resorcinol

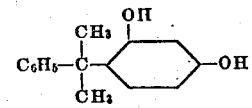

a white crystalline solid having a melting point of 126° C., and a boiling point of 210° C. at 10 millimeters pressure.

Example 3

A mixture of 2 mols (220 grams) of hydroquinone and 3 c. c. of concentrated hydrochloric acid was dissolved in glacial acetic acid, and was heated to a temperature of about 140° C. 1 mol (118 grams) of alpha-methyl styrene was then added with agitation during 0.5 hour, after which the mixture was heated for 2.5 hours more to complete the reaction. The resulting crude material was cooled and fractionally distilled at reduced pressure to remove the acetic acid solvent and to separate the reaction products. There was obtained 2-(alpha phenyl isopropyl) hydroquinone

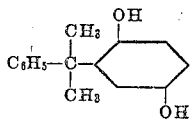

a white crystalline solid having a melting point of 111° C. and a boiling point of 219° C. at 10 millimeters pressure.

Other modes of applying the principle of the invention may be employed instead of those explained, change being made as regards the details disclosed, provided the product or method stated in any of the following claims or the equivalent of such stated product or method be obtained or employed.

We claim:

1. An aralkyl polyhydric phenol corresponding to the general formula

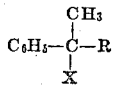

wherein X is a phenolic radical selected from the class consisting of polyhydroxy aryl and polyhydroxy halo-aryl radicals of the benzene series, and R is a lower alkyl radical.

2. An aralkyl polyhydric phenol corresponding to the general formula

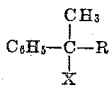

wherein X is a polyhydroxy aryl radical of the benzene series, and R is a lower alkyl radical.

3. An (alpha phenyl isopropyl) dihydroxy benzene.

4. 4-(alpha phenyl isopropyl) catechol.

5. 4-(alpha phenyl isopropyl) resorcinol.

6. 2-(alpha phenyl isopropyl) hydroquinone.

7. The method of preparing an aralkyl polyhydric phenol which comprises reacting a 2-phenyl-1-alkene selected from the class consisting of alpha methyl styrene and alpha ethyl styrene with a phenolic compound selected from the class consisting of polyhydroxy aromatic hydrocarbons and polyhydroxy aromatic halo-hydrocarbons of the benzene series, in the presence of a condensation catalyst.

8. The method of preparing an aralkyl polyhydric phenol which comprises reacting a 2-phenyl-1-alkene selected from the class consisting of alpha methyl styrene and alpha ethyl styrene with a phenolic compound selected from the class consisting of polyhydroxy aromatic hydrocarbons and polyhydroxy aromatic halo-hydrocarbons of the benzene series, in the presence of a small proportion of a condensation catalyst.

9. The method of preparing an aralkyl polyhydric phenol which comprises reacting a 2-phenyl-1-alkene with a phenolic compound selected from the class consisting of polyhydroxy aromatic hydrocarbons and polyhydroxy aromatic halo-hydrocarbons of the benzene series, in the presence of a small proportion of a hydrogen halide selected from the class consisting of hydrogen chloride and hydrogen bromide.

10. The method of preparing an aralkyl polyhydric phenol which comprises reacting a 2-phenyl-1-alkene with a polyhydroxy aromatic hydrocarbon of the benzene series in the presence of a small proportion of a hydrogen halide selected from the class consisting of hydrogen chloride and hydrogen bromide.

11. The method of preparing an (alpha-phenyl isopropyl) dihydric phenol which comprises reacting alpha-methyl styrene with a dihydroxy benzene in the presence of a small proportion of a condensation catalyst.

12. The method of preparing an (alpha-phenyl isopropyl, dihydric phenol which comprises reacting alpha-methyl styrene with a dihydroxy benzene in the presence of a small proportion of a hydrogen halide selected from the class consisting of hydrogen chloride and hydrogen bromide.

13. The method of preparing an aralkyl polyhydric phenol which comprises reacting a 2-phenyl-1-alkene with a phenolic compound selected from the class consisting of polyhydroxy aromatic hydrocarbons and polyhydroxy aromatic halo-hydrocarbons of the benzene series, in the presence of between about 0.1 and about 10.0 parts by weight of a hydrogen halide selected from the class consisting of hydrogen chloride and hydrogen bromide per 100 parts of the phenolic compound, and at a temperature between about 50° and about 200° C.

14. An aralkyl polyhydric phenol corresponding to the general formula

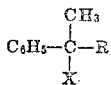

wherein X is a polyhydroxy halo-aryl radical of the benzene series and R is a substituent selected from the class consisting of lower alkyl radicals and hydrogen.

RALPH P. PERKINS.
FRED BRYNER.